United States Patent
Arnason et al.

(10) Patent No.: US 7,615,242 B2
(45) Date of Patent: Nov. 10, 2009

(54) METHOD AND APPARATUS FOR PROCESSING AND TRIMMING A PRODUCT

(75) Inventors: Ingolfur Arnason, Akranes (IS); Hordur Gardarsson, Akranes (IS); Gylfi Borgthor Gudfinnsson, Akranes (IS); Bryndis Ragnarsdottir, legal representative, Akranes (IS)

(73) Assignee: Skaginn HF., Arkanes (IE)

( * ) Notice: Subject to any disclaimer, the term of this patent is extended or adjusted under 35 U.S.C. 154(b) by 828 days.

(21) Appl. No.: 10/523,691

(22) PCT Filed: Aug. 6, 2003

(86) PCT No.: PCT/IS03/00022

§ 371 (c)(1),
(2), (4) Date: Feb. 3, 2005

(87) PCT Pub. No.: WO2004/012516

PCT Pub. Date: Feb. 12, 2004

(65) Prior Publication Data

US 2006/0035004 A1   Feb. 16, 2006

(30) Foreign Application Priority Data

Aug. 6, 2002  (IS) ........................ 6490
Aug. 16, 2002 (IS) ........................ 6510

(51) Int. Cl.
*A22C 25/17* (2006.01)

(52) U.S. Cl. ............... 426/480; 426/643; 426/524; 99/540; 99/541; 99/584; 99/588; 99/589

(58) Field of Classification Search ............ 426/479, 426/480, 524; 99/540, 541, 584, 588, 589
See application file for complete search history.

(56) References Cited

U.S. PATENT DOCUMENTS

| 1,921,440 | A |   | 8/1933  | Harden |  |
| 1,953,520 | A | * | 4/1934  | Vogt ........................... 62/60 |
| 2,380,755 | A | * | 7/1945  | Hendrickson ............... 452/126 |
| 4,882,811 | A | * | 11/1989 | Ewing ......................... 452/119 |
| 5,358,441 | A | * | 10/1994 | Hjorth ......................... 452/180 |
| 5,507,690 | A | * | 4/1996  | Eide ............................ 452/161 |

FOREIGN PATENT DOCUMENTS

| DE | 85 831 A    |   | 11/1971 |
| JP | 9-28284     | * | 2/1997  |
| WO | WO-95/24129 A |   | 9/1995  |
| WO | WO-98/05215 A1 |  | 2/1998  |
| WO | WO-99/07228 A |   | 2/1999  |

* cited by examiner

*Primary Examiner*—Anthony Weier
(74) *Attorney, Agent, or Firm*—Birch, Stewart, Kolasch & Birch, LLP

(57) ABSTRACT

The present invention includes a method for processing and trimming products such as fish fillets where the product is form frozen forming a thin frozen shell round the product and the subsequent processing of the product uses that condition to remove the fish skin and bones with more efficiency than any prior art methods whereas the quality of the product is increased due to less loss and less loss in liquid from the product than known by prior art methods.

14 Claims, 14 Drawing Sheets

METHOD AND APPARATUS FOR PROCESSING AND TRIMMING A PRODUCT

This application claims priority to IS patent applications no. 6490, dated Aug. 6, 2002 and no 6510, dated Aug. 16, 2002.

FIELD OF THE INVENTION

The present invention relates to a method and an apparatus for processing and trimming products such as fish fillets.

BACKGROUND

In the last years there has been constant development in the processing of raw material for food processing such as fish products. The emphasis has been on better exploitation and quality of products as well as demands towards increased efficiency of the processing.

Prior and present technology used in processing and in removing the fish skin damage the product when the skin is removed and the product is treated.

Methods, equipments and instruments for removing fish bones in fish fillets have been developed in the last years, and efforts have been made to analyse, locate and remove fish bones with methods based on advanced computer equipment for locating and analysing fish bones. Consequently, bone removal has been attempted with advanced computer equipment.

This technology is disadvantageous because it is very expensive and unreliable in bringing appropriate results.

DESCRIPTION OF THE INVENTION

The object of the present invention is to provide a method for processing products, such as fish fillets, which increases the efficiency, quality and value of the products. A further object of the present invention is making the processing of products more advantageous, and solving problems in processing products in a simpler and more advantageous way.

Processing products such as fish fillets is mostly focused on removing the fish skin and bones, as well as barbs, parasites and other defects. Further processing may involve cutting the fillet into smaller pieces, depending on the nature of the final product.

In processing fish fillets, it is important to avoid unnecessary handling of the product, which causes looseness in the product and therefore lowers the quality and value of the product. This will lead to reduces the possibilities for further processing of the product and the end product will be of less value.

Also, it is important to obtain high efficiency in the processing of the product in order to keep the waste to a minimum, thus increasing the value of the product.

These objectives can be reached with a processing method described here below.

Form Freezing

By form freezing the fish skin and the outmost layer of a product such as a fish fillet, it is possible to treat the product without damaging the fillet with mistreatment and looseness in the fish-meat.

By form freezing a product the outmost layer of the product is fast frozen, so that the freezing does not extend to the core of the product but the form of the product obtains stiffness and thereby prevent reduction of the quality of the fish-meat as with traditional freezing.

When the product reaches such low temperature and the temperature of the outmost layer is down to −30° Celsius the ice crystals in the product become so small that a decrease in the quality due to the freezing in the outmost layer is negligible.

This may be performed in a freezer with a combined blow- and a touch-freezing (conduction/convection), as in an example in a multi-freezer with form freezing belt made of plurality of aluminium drops, but such freezers can freeze a product that much that these requirements are fulfilled.

This way a thin freezing layer may be formed around a fish fillet without freezing the fish-meat significantly.

Removing the Fish Skin

The main object of the present invention, which differs form prior art methods in that as the skin of the fish is removed, it is done when the fillet is form frozen, e.g. from below and with this method the skin is removed without fish-meat being cut simultaneously from the fillet as is common in known methods, where knives are used to remove the fish-meat from the fish skin and simultaneously take a part of the fish-meat.

Simultaneously removing the fish skin from the fish fillet, so that no fish meat is removed therewith, the look of the fillet is better, and the quality higher than in prior methods. Also the efficiency of the processing is increased where a larger part of the products stays in the fillet compared to prior art methods.

Current methods for removing fish skin are rough on the fish meat and looseness in the fillets is very often the result when fish skin is removed using these methods. Looseness in fish fillets increases risk of damage of the products and decreases their value considerably. Using the method described herein, the fish skin removal is performed on a form freezed fillet and during the skin removal the fillet is not bent in any way preventing loss of product quality usually obtained using current methods.

Bone Removing

When the bones in the fish fillets are removed with prior art methods, a part of the meat around the bones is removed, and therefore a part of the product is lost and becomes a waste, which often is used for a low price product. This additional product is relatively a large part in conventional processing of fish fillets.

The method described here, differs greatly from prior art methods in that when the bones are removed, they are pulled out from the form frozen fillet from the fish skin side of the fillet, where the bones are partly frozen to the fish skin on the end facing the fish skin.

The part of the bones facing the skin have a tiny knuckle, which may be compared to pin head on the ends, and through the form freezing as described earlier, the fish skin alone freezes, but not the fish-meat in the middle.

When the bone ends freeze to the fish skin, but the fish fillet is not frozen in the middle the bones are loose within the fish-meat but frozen to the fish skin and thereby are pulled out simultaneously when the fish skin is removed.

Consequently, it is not necessary to cut fish-meat from the fish fillet when the bones are removed and thereby the efficiency in the processing is increased.

When the bones have been removed in this way the part of the fish fillet, which with prior art methods has been removed, is still there in the fish fillet. Thereby, the fish fillet may be cut into valuable products in the area, where the bones are to be found.

The part of the bones that have not been removed this way, which is small, is subsequently removed by applying a tool, similar to pliers, so that the part of the fish fillet that faces the fish skin and which contains bones is clamped and the bones are pulled out.

Other methods are possible for removing the fish bones such as equipment that uses rollers, combs and clamps or mechanical devices removing fish skin and bones automatically (see later).

The fillets in which the bones have not been perfectly removed, are approximately 10% and special equipments available on the market, such as bone scanner, may be used for analysing these fillets and subsequently with automatic equipment, or manually removing those aside, and removing the remaining bones.

Lowered Temperature

The present invention, differs from prior art methods in that by form freezing the fish fillet, the temperature of the product is lower during the processing process than in prior art methods, and thereby preventing influences from heat lowering the quality of the product. Thereby, the quality of the product is increased significantly compared to other methods.

Less Looseness

Secondly, the present invention differs from prior art methods in that where the product has the stiffness from the form freezing, it is easier to cut it into desirable sizes and it is possible to cut the larger part of the product in the most valuable products without any loss and thereby increasing the efficiency of the product. This part is important in comparison to prior art methods where the loss due to the processing prevents the product from being cut into desirable sizes.

Less Liquid Loss

The present invention, also differs from prior art methods in that by form freezing the fillet, a loss in the liquid from the product is prevented where the natural liquid of the fillet is pressed out in prior art methods.

It is important to control the form freezing so that the product does not freeze too much or too little, where too little form freezing causes problems in removing the fish skin and the bones, and too much form freezing results in that it is difficult to remove the bones with the method described here earlier. It is best that the form freezing is such that it extends close to 1-2 mm within the fish-meat on the fish-skin side.

DETAILED DESCRIPTION

Following is a detailed description of the present invention, where different aspects and tools are described in more detail.

In a first aspect of the present invention, a method is disclosed for processing fish or fish fillets with the aim of increasing the quality and value in the processing. This is accomplished by removing the fish skin and removing at least a part of the bone area, wherein the method comprises:

form freezing the fish to be processed so that the necessary form freezing for the processing is obtained, and removing the fish skin after the necessary form freezing is obtained, wherein the form freezing has the function that the adhesion in the fish-meat adjacent to the fish skin is larger than the adhesion between the fish-meat and the fish skin, which follows in that by removing the fish skin no fish-meat is removed with the fish skin, and wherein the form freezing has also the function that the part of the bone area that is fastened to the fish skin is removed as the fish skin is removed.

In the present context the remaining parts of the bone area may be removed manually.

In the present context, the form freezing comprises fast freezing the outmost layer of the product, so that the freezing is not extended towards the core of the fish or the fish fillet. This may be regulated by adjusting the speed of the form freezing such that it freezes 1-2 mm of the outmost layer of the fish. This may result in that the temperature of the outmost layer is below −20° C., while the core temperature of the fish-meat is higher than 0° C.

In the present context the lowering of temperature of the fish fillet in the processing increases the value of the end product by decreasing damages due to temperature, such as micro organism growth and chemical changes, as a result of changes in enzyme activity. The form freezing of a fish fillet also causes a lowering in the temperature during processing and further increases the value of the product due to less handling during the processing, such as looseness in the fish fillet. Furthermore, the form freezing increases the possibilities of cutting the product into valuable products depending on the demands for the end product. Even further, the form freezing of the fish fillet results in less liquid loss in the product during the handling and the processing.

In a second aspect of the present invention, an apparatus for processing fish is provided with the aim of increasing the quality of the processing, wherein the apparatus comprises:

cooling means for form freezing the fish, device for processing the fish, and device for removing skin and pin bones The third aspect of the present invention relates to a product processed with a method and apparatus according to any of the preceding claims.

FIGURES

Further details of the invention are disclosed in the following figures.

The numbers in the text relate to numbered items in the figures.

Figure 1A:
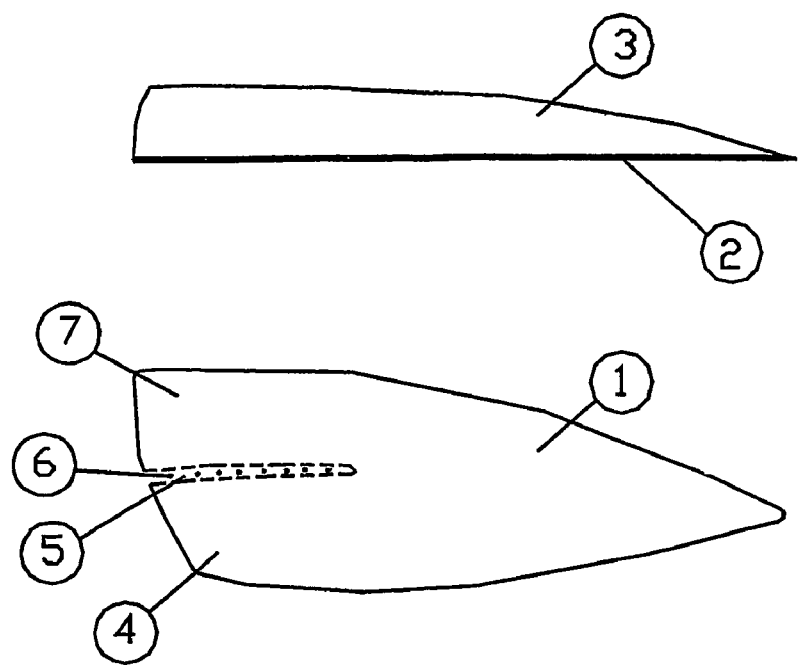
FIGS. 1a and 1b shows a fish fillet, where bones and fish skin have not been removed.
Figure 1B:
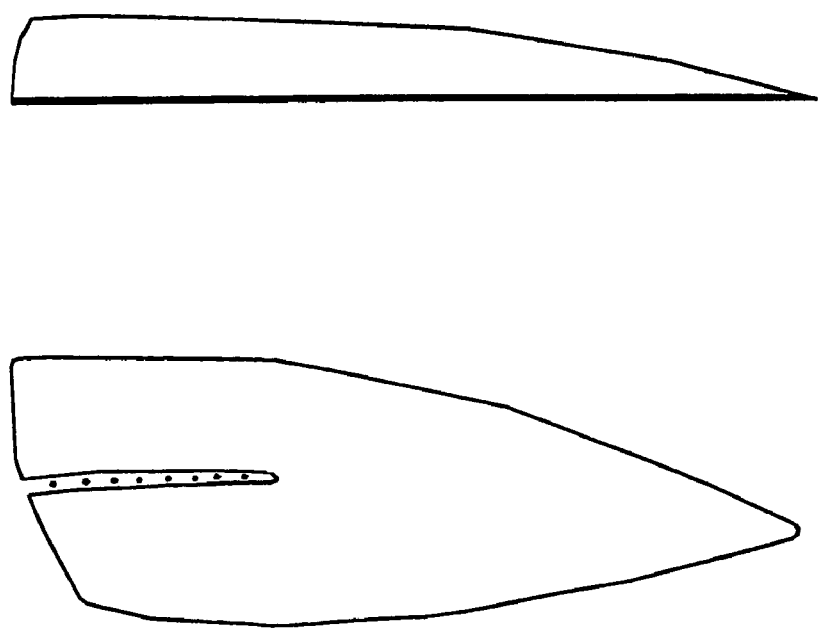

FIGS. 1a and 1b show a fish fillet where the bones have not been removed.

Figure 2A:
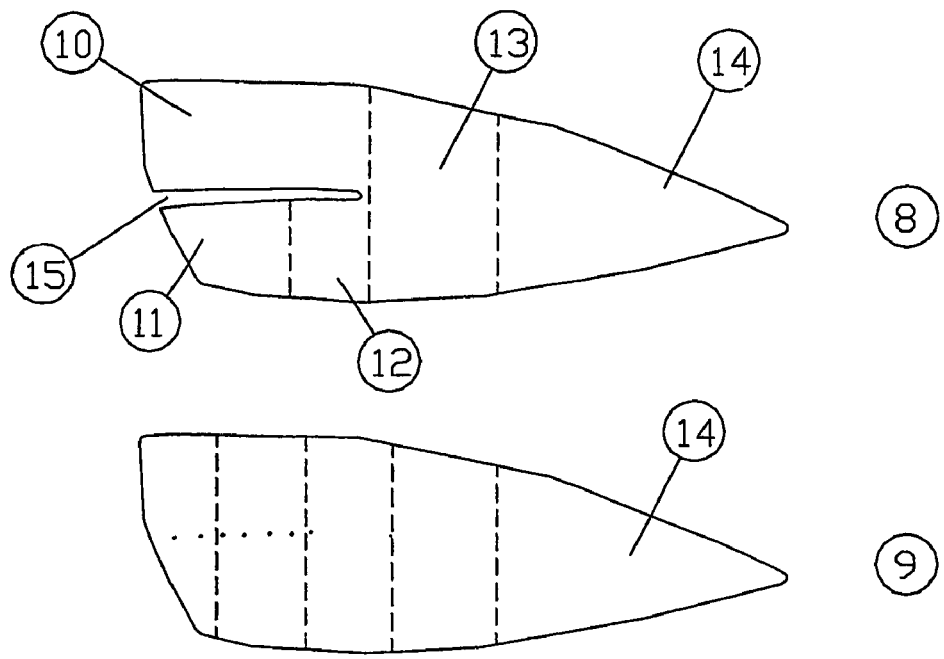
FIGS. 2a and 2b shows a fish fillet, which has been subjected to one way of preferred cutting.
Figure 2B:
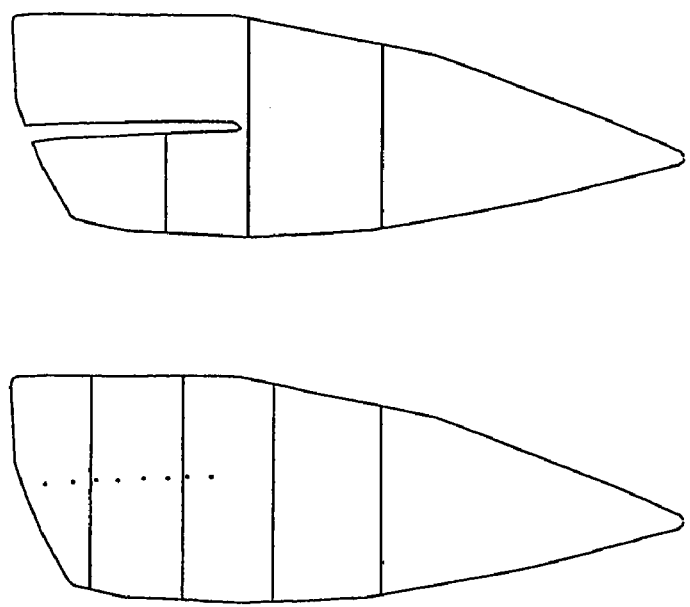

FIG. 2 shows a fish fillet 8 where the fish bones have been removed with a prior art method and a fish fillet 9 where the bones have been removed with the new method. When fillet is cleaned with prior art method, a portion 15 is removed from the fillet, but that has large influence on how the fillet should be cut into products. When the portion 15 is removed, it is usually necessary to cut it into pieces numbered 10-14 in FIG. 2 and thereby the thin piece 11 is as an example not well used and the piece 12 is difficult to use as a high value product among the products 10, 13 and 14. It is even difficult to obtain a good middle piece 13 if the cut due to the fish bones is extended too far towards the fish fillet. This segmentation of the fillet has large influence on the advantageousness of the processing.

When the bones are removed from a fish fillet with the new method, compare number 9 on FIG. 2, it is possible to cut the fillet into pieces, which use the thin piece in the most valuable products so that the new method gives opportunity on more valuable products in the processing where larger a part of the fillet is sorted as the most valuable products than with prior art methods. Simultaneously, the area 15 on the fillet is used for products so that the efficiency is better than in prior art methods.

Figure 7:
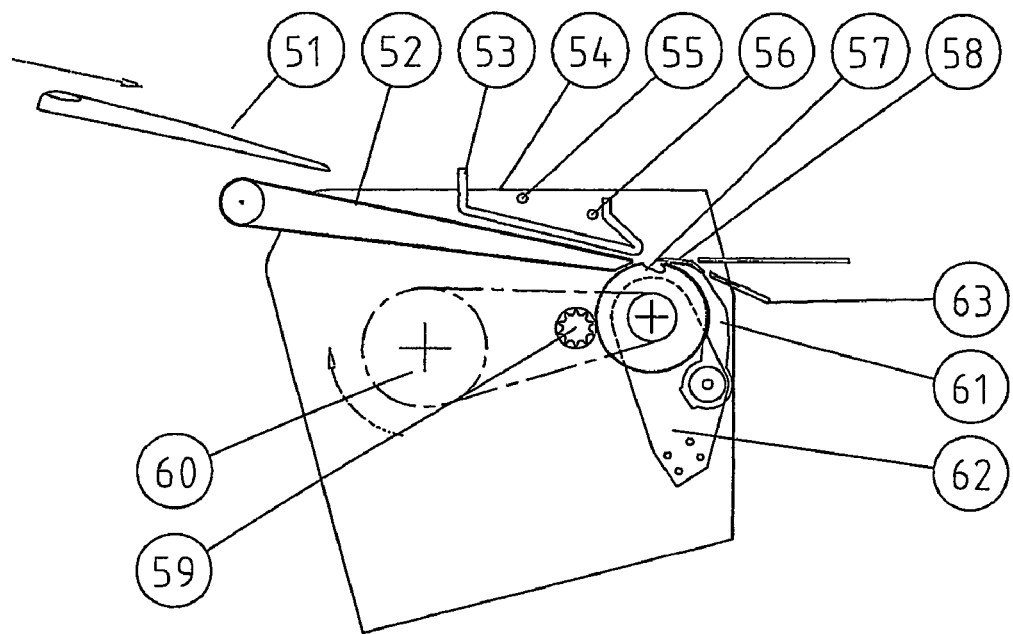
FIG. 7 shows a fish fillet, which has been subjected to a second way of preferred cutting.

FIG. 7 discloses a fish fillet 47, which is cut into a valuable neck piece 48 and a tail piece 49 and thereafter remaining part of the fillet is cut into smaller pieces (nuggets) 50 for freezing as a breaded products. This product is very hard to produce from fresh fish, processed by conventional methods and here a new product produced by the method disclosed herein is provided obtaining more values from the raw material as compared to conventional methods.

Form Freezing

Figure 3A:
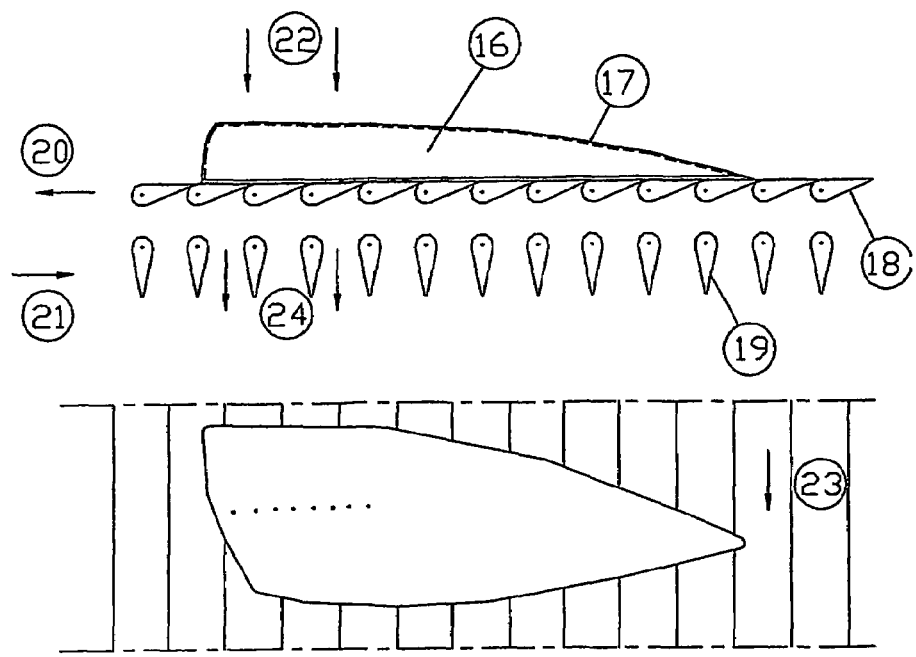
FIGS. 3a and 3b shows a form freezing
Figure 3B:
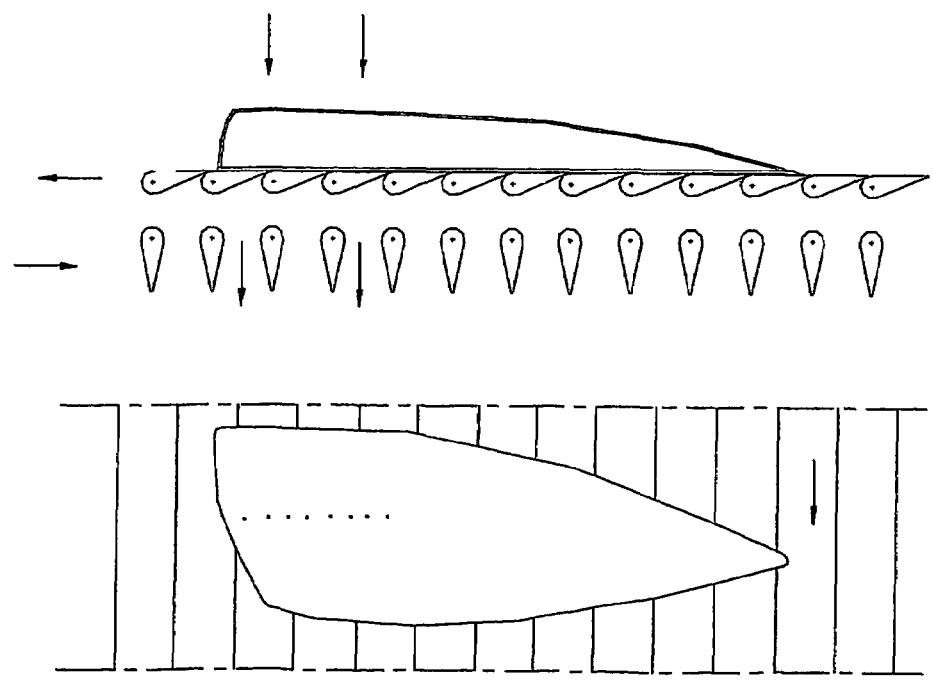

FIGS. 3a and 3b shows the principle of the form freezing. The form freezing with the new method is based on combining blow-and touch-freezing.

A fillet 16 in FIG. 3a is placed on the conveyor belt in a freezer comprised of drop-shape aluminium beam 18 and 19 wherein these drops generate a smooth surface in the upper part of the conveyor part where the fillet is placed on.

The side view of the aluminium beam has a drop-like shape. They have free ends, and are rotatable around its length axis so that on the upper part of the conveyor 18 they form a smooth surface under the fillet, but on the return way 19 they rotate such that there is an interior between them where the narrower ends face downwards.

There is therefore an opening for the airflow 24 which cools the aluminium drops and therefore lowers the temperature of the aluminium such that when they rotate back to the vertical position, the heat from the fish fillet has been removed through a touch freezing. The airflow 22 from above and sidewise 23 freezes that part of the fillet, which does not touch the aluminium belt so that frozen shell is generated around the fillet.

This method for the form freezing makes it possible to freeze a thin shell 17 in FIG. 3a round the fillet which become unfrozen within the fillet, while prior art methods for freezing take longer time to form freeze the fish fillets where the freezing extends deeper toward the centre of the fillet before the necessary freezing is obtained in said shell 17 around the fillet.

Bone Removing and Removing the Fish Skin

With said form freezing the fish fillet has been form frozen so that 1-2 mm shell has been generated around the fillet. This form frozen shell gives the fillet strength, which makes it possible to remove the fish skin from the fillet without removing any fish-meat simultaneously with the fish skin, which reduces the efficiency of the processing.

Figure 4A:
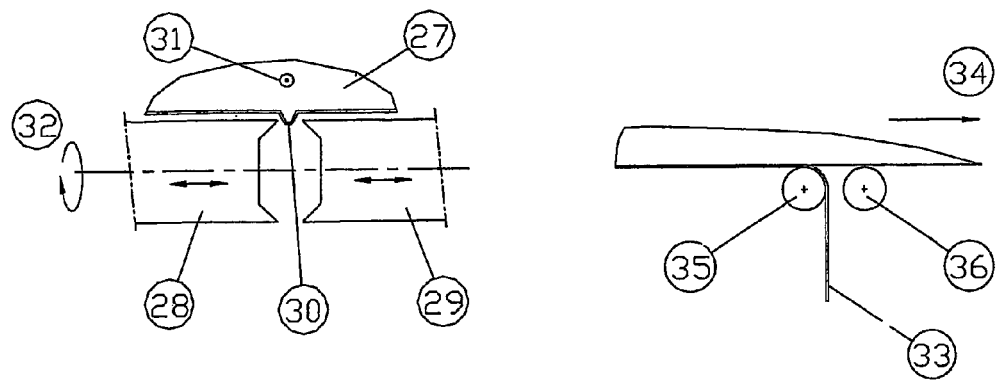
FIGS. 4a and 4b shows a roller device
Figure 4B:
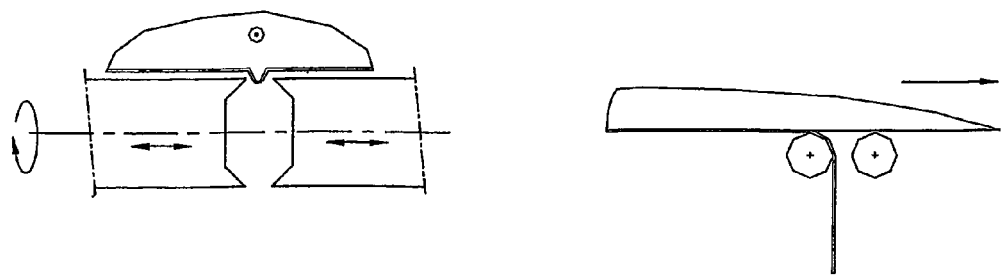

FIGS. 4a and 4b show how the fish skin is being removed from the fillet 34 where it is being advanced over rollers 35 and 36 the fish skin being pulled down from the stiff fillet 34 so that the fish skin is removed downwards.

It appears that the largest part of the fish bones in the bone area 6 shown in FIG. 1a follows the fish skin and are removed from the fillet by removing the fish skin, where the ends of the bones are frozen fixed to the fish skin through the form freezing and follow the fish skin.

The roller 35 shown in FIG. 4a may be implemented as shown in FIG. 4 with a roller, which is shaped as the roller parts 28 and 29 in FIG. 4. They rotate around the axis 32 and the ends continually move towards and away from each other so that the roller ends clamp the part of the fillet where the bone area is located 30, so that the bones are released more easily from the fillet and follow the fish skin by removing it.

Figure 5A:
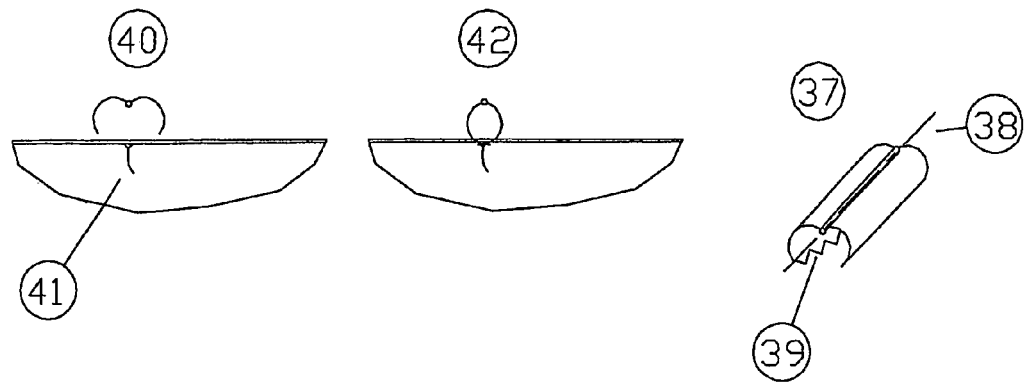
FIGS. 5a and 5b shows a comb device
Figure 5B:
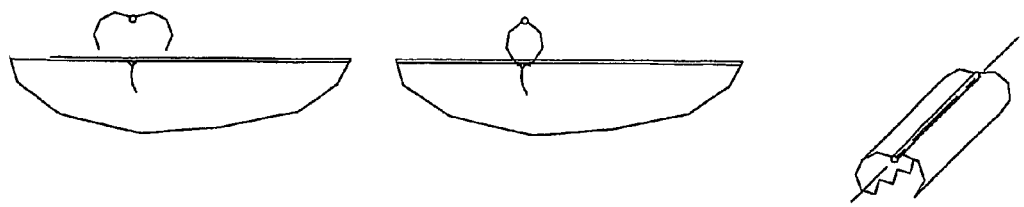
Figure 6:
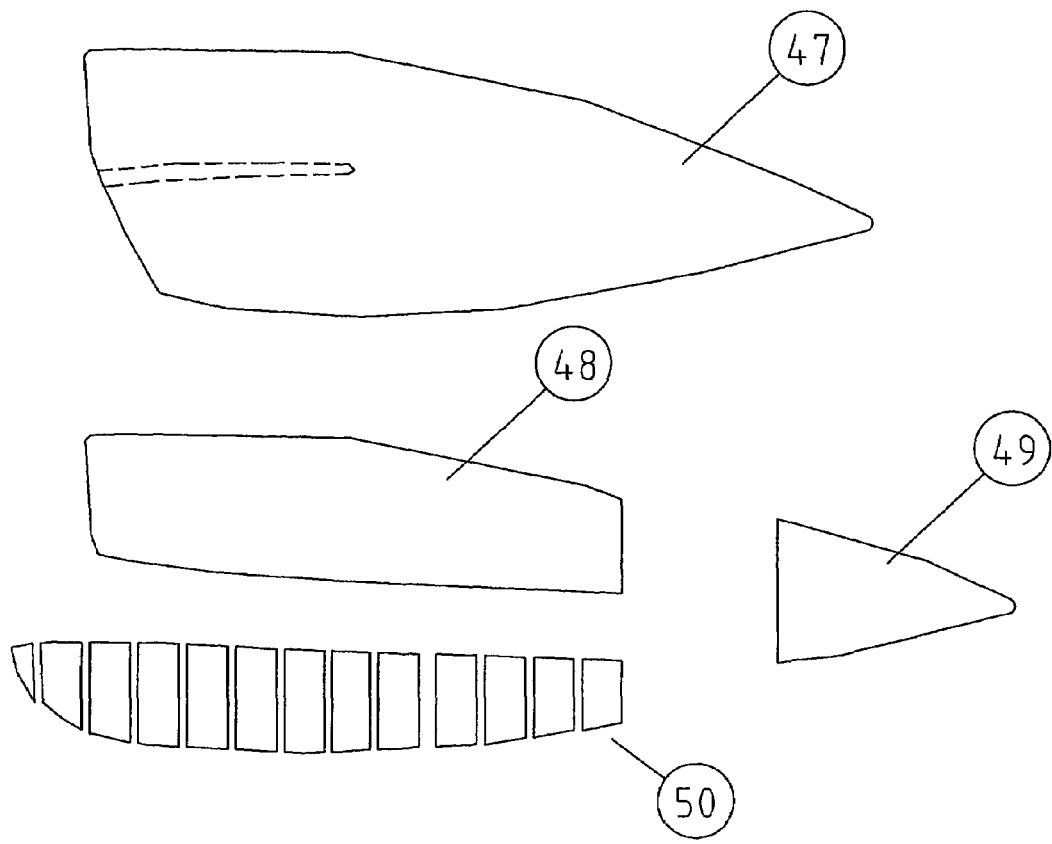
FIG. 6 shows a fish fillet after skin and bone removal using skin freezing.

It is possible to remove the part of the bones, which is not automatically removed when the skin is removed with comb 37 as shown in FIGS. 5a and 5b show.

The comb may be shaped with two parts, which rotate around an axis 38 where teeth are formed 39 so they intersect crosswise without the teeth intersecting with each other. When fillet with bone area 41 faces the comb, the comb grabs the bones and the fish-meat surrounding the bones and the bones are pulled out of the fillet.

This may be performed mechanically and automatically, and also this may be done manually with good success.

The comb may be formed in different ways such as by having the teeth with quadrangle shape so that, as the comb closes the tooth's intersect and if the interval between them is kept larger than the teeth, each part of the comb may be pulled in longitudinal direction of the axis 38 towards each other so that the teeth of the comb clamp the bones between them.

Manual Clamp

Figure 8:
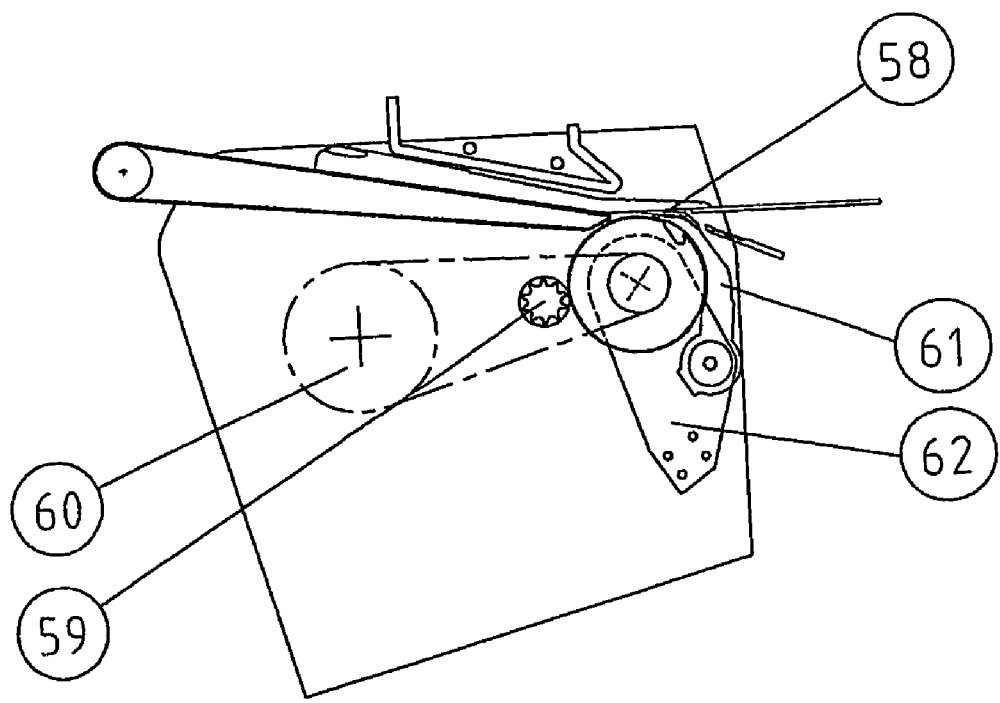
FIGS. 8 to 14 show a device, which automatically removes skin and bones from a fish fillet.

FIG. 8 shows how the fillet may be processed, by creating a small lobe 45, simultaneously to the fish-skin removing. The lobe is cut through the fish skin slightly into the fish-meat around the bone area.

The fillet is subsequently form frozen as described earlier and after the fish skin removal, a strip with fish skin fixed to the fillet on the edge of the bone area. This fish skin strip, which is frozen to the bones, can then be removed either manually or mechanically with clamp equipment as described earlier.

Skinning and Pin Bone Removal Using an Automated Device.

Figure 12:
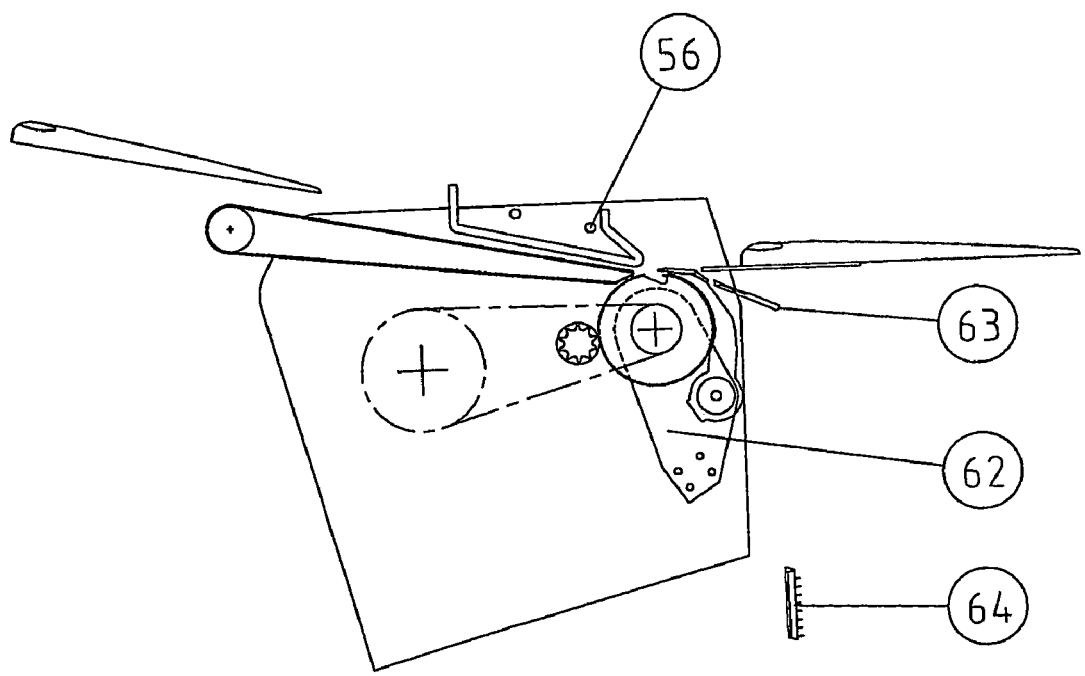
Figure 13:
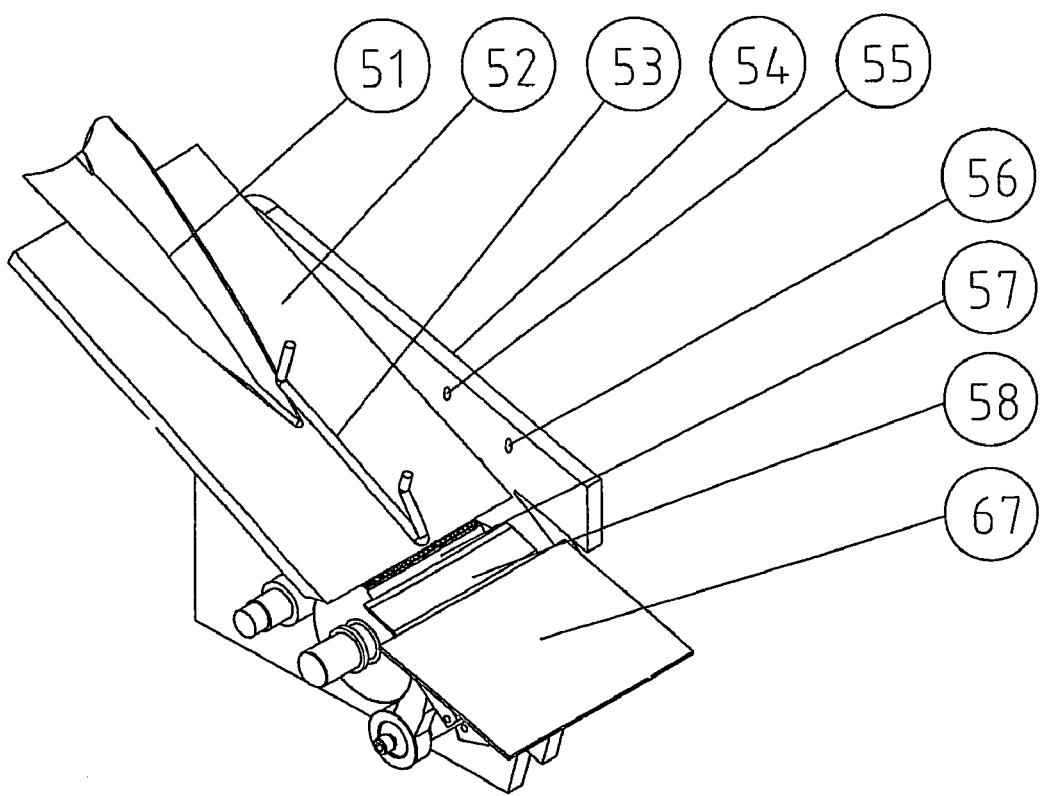
Figure 14:
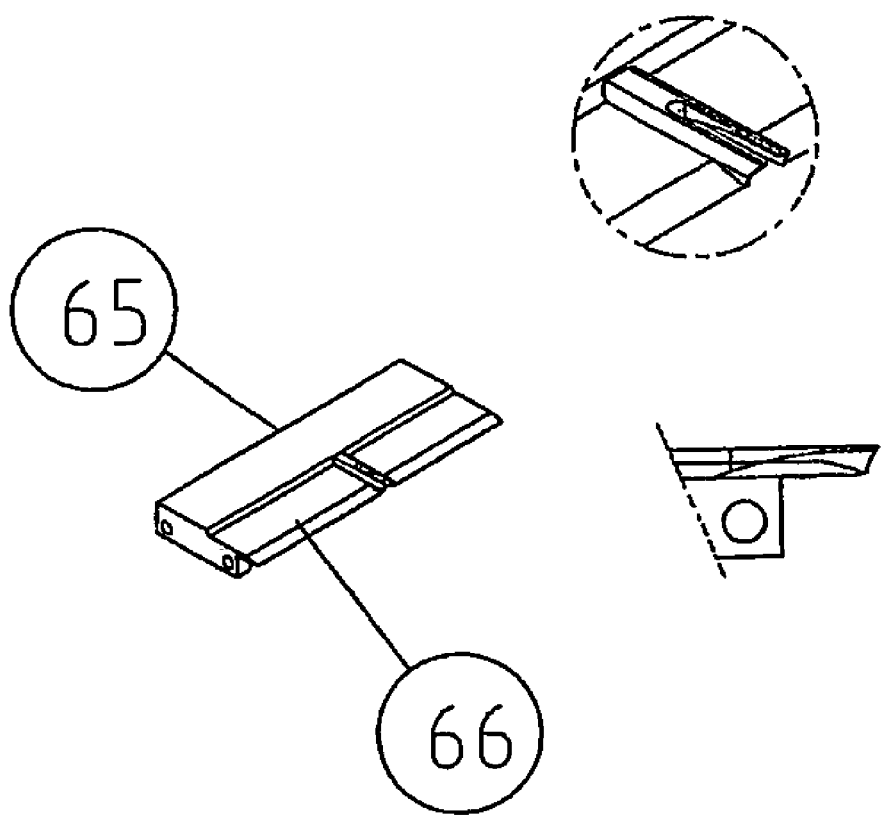

An automated method to remove skin and pin bones is described in FIGS. 8-15. FIG. 14 is an isometric drawing of a device performing skin and bone removal from fish fillets. The side of the device 54 facing the reader has been removed in FIG. 14 to give an overview of the device. A fish fillet 51 is placed onto a conveyor belt 52 with the tail pointing in the direction of which the fillet is moving and the conveyor belt 52 transports the fillet towards a guidance 53 positioning the bones in the fillet. The fillet passes sensors 55 and 56 positioning the fillet on the conveyor belt 52. After skin and bone removal the fillet is transferred into a lane 67, which delivers the fillet for further processing.

Figure 9:
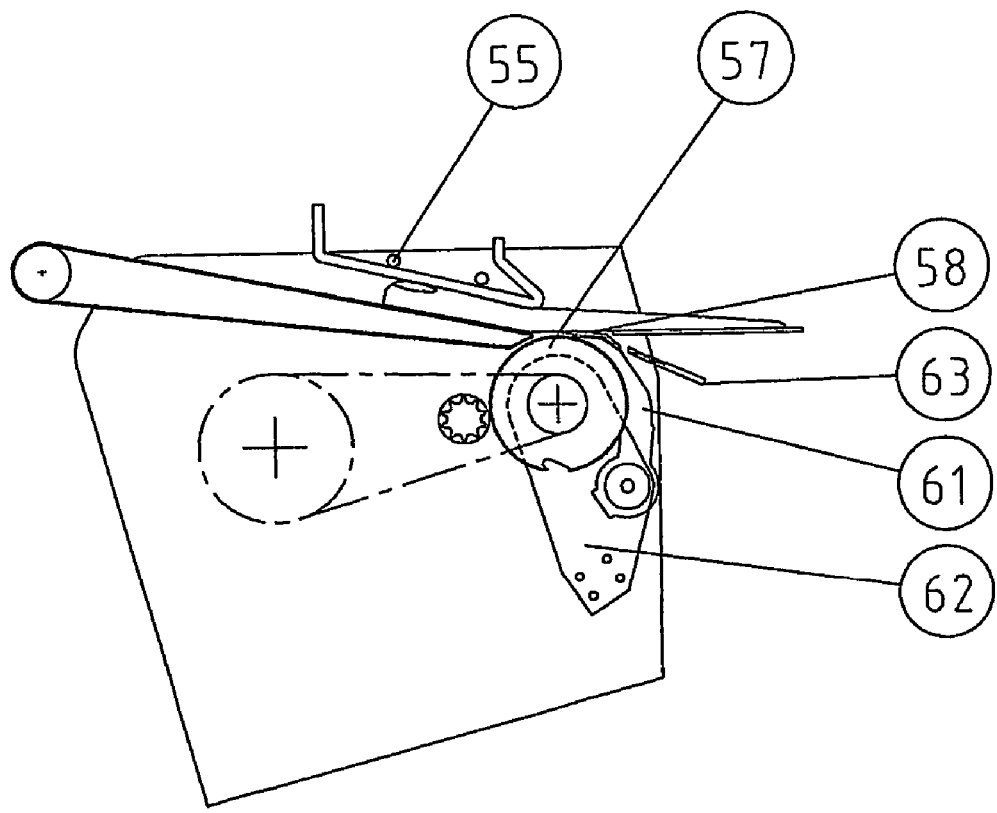

In FIG. 9 the skin removal has started. The tail end of the fillet is constrained in a groove on a skin-removing roller 57 and the roller pulls the fillet so that the skin is removed from the fillet by the knife 58 and the support means 59 supports the movement of the skin along the roller 57. For preventing the skin to separate from the roller 57 a spooler shaft with ridged surface 59 is placed behind the roller 57 turning in a direction opposite to the direction of the roller removing the skin away from the fillet.

Figure 10:
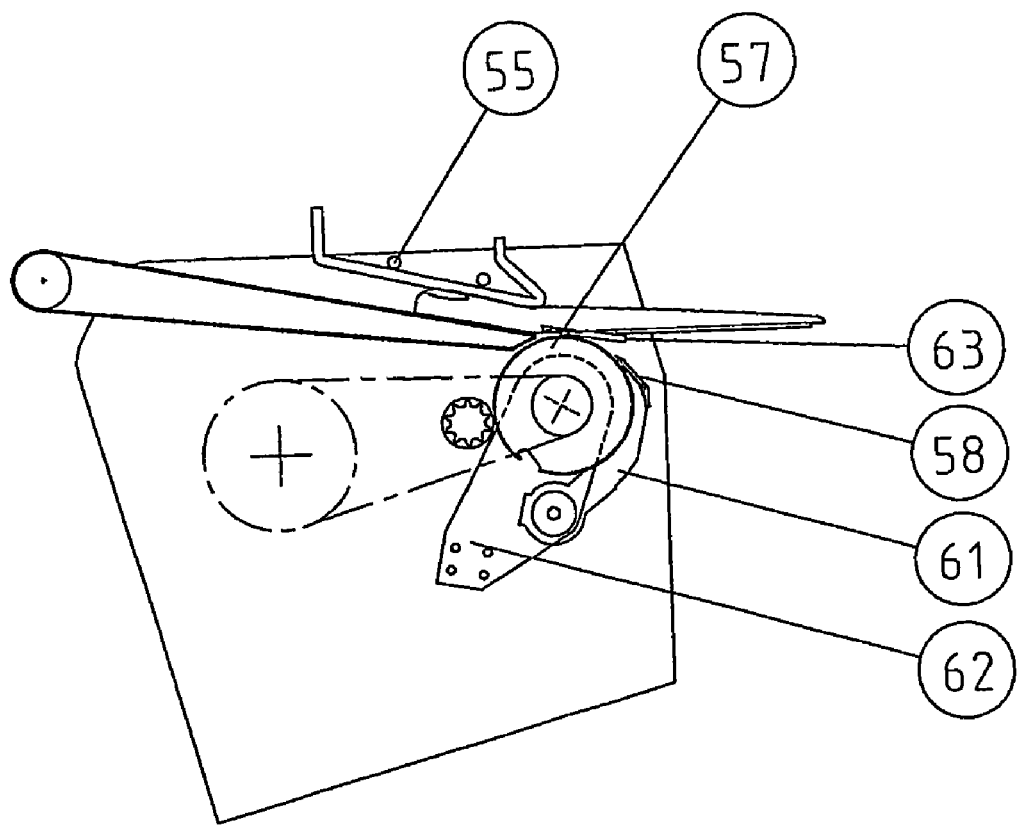
Figure 11:
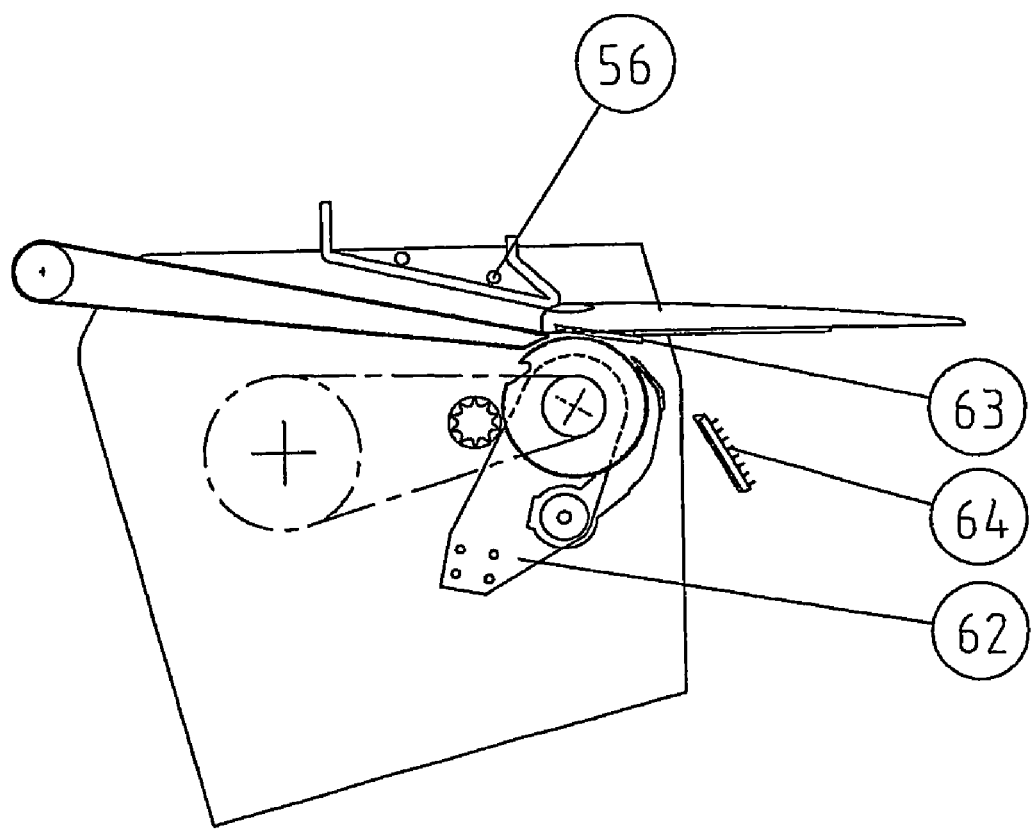

In FIGS. 10 and 11, the neck end of the fillet has passed the sensor 55 and a signal is sent to the control unit of the system. FIG. 11 shows that the carrying means 62 for the roller 57, the supporting means 61 and the skin-removing knife 58 has turned approximately 45 degrees from a first position in a direction with the roller 57 into a second position. The bone removing knife 63 moves upwardly into the fillet and removes the pin bones simultaneously as a the fillet is skinned and proceeds through the device.

FIGS. 12 and 13 disclose how the fillet is transported further through the processing line and the bone area is removed as the next fillet enters the conveyor belt 52. The new fillet is first transported to the roller 57 when the bone removing knife 63 is back in resting position and the carrying means 62 has turned back and moved the supporting means 61 and the skin-removing knife 58 into first position. When the device is back into first position the conveyor belt 52 transports the next fillet to the roller for skin and bone removal.

In FIG. 15 one type of knife 65 for removal of pin-bones is shown. The knife can be formed in many ways so that it is suited for different fish types. Also, the knife can be formed so that the blades are on hinges and the blades can then be pulled together as the bone removal takes place. In this manner the knife functions as the device shown in FIGS. 4a and 4b show simultaneously cutting and removing the bones.

The invention relates therefore to processing products with a method and apparatus, which has been described here.

The invention claimed is:

1. A method for processing fish or fish fillets by removing at least a part of the bone area simultaneously as the fillet is skinned, the method comprising:
   form freezing the fish to be processed by combining blow- and-touch-freezing, and
   removing the fish skin after the necessary form freezing is obtained,
wherein the form freezing comprises cooling the surface of a conveyor belt by an airflow, the conveyor belt in a freezer comprising drop-shape aluminium beams, lowering the temperature of the aluminium by airflow, such that the heat from the fish fillet is removed through touch freezing, and wherein the airflow from above and sidewise freezes that part of the fillet, which does not touch the aluminium beam, so that frozen shell is generated around the fillet.

2. A method according to claim 1, wherein the form freezing has the function that the adhesion in the fish-meat adjacent to the fish skin is larger than the adhesion between the fish-meat and the fish skin which follows in that by removing the fish skin no-fish meat is removed with the fish skin, and wherein the form freezing has also the function that the part of the bone area that is fastened to the fish skin is removed as the fish skin is removed.

3. A method for processing fish according to claims 1 or 2, wherein the remaining parts of the bone area are removed manually.

4. A method for processing fish according to claim 1, wherein the form freezing comprises fast freezing the outmost layer of the product so that the freezing is not extended towards the core of the fish or the fish fillet.

5. A method for processing fish according to claim 1, wherein the speed of the form freezing is such that it freezes 1-2 mm of the outmost layer of the fish.

6. A method for processing fish according to claim 1, wherein the temperature of the outmost layer is below −20° C, while the core temperature of the fish-meat is larger than 0° C.

7. A method for processing fish according to claims 1 or 2, wherein lowering the temperature of the fish fillet in a processing increases the value of the end product by decreasing damages due to temperature such as microorganism growth and chemical changes as a result of changes in enzyme activity.

8. A method for processing fish according to claim 1, wherein the form freezing of a fish fillet causes a lowering in the temperature during processing and increases the value of the product due to less handling during the processing such as looseness in the fish fillet.

9. A method for processing fish according to claim 1, wherein the form freezing of the fish fillet causes a lowering in the temperature during the processing.

10. A method for processing fish according to claim 1, wherein the form freezing increases the possibility of cutting the product into valuable products.

11. A method for processing fish according to claim 1, wherein the form freezing of the fish fillet results in less liquid loss in the product during the handling and the processing.

12. An apparatus for removing at least a part of the bone area simultaneously as the fillet is skinned by form freezing the fish to be processed using the combining blow-and-touch-freezing method of claim 1, the apparatus comprising:
   cooling means for form freezing the fish, the cooling means further comprising:
      conveyor belt, and
      openings for airflow (22), (23), (24) for cooling the conveyor belt and the fish fillet,
   device for removing skin and pin bones, the device further comprising:
      a conveyor belt
      guidance for positioning the bones in the fillet
      sensors, and
      a skin-removing unit comprising a roller, a knife and a spooler shaft,
      wherein the upper part of the conveyor belt comprises drop-shape aluminum beams (18) and (19), generating a smooth upper surface.

13. An apparatus according to claim 12, wherein the spooler shaft has a ridged surface and the spooler shaft is turning in a direction opposite to the roller for removing the skin away from the fillet.

14. A product processed with a method and apparatus according to claim 1.

* * * * *